United States Patent
Reinsberg et al.

(10) Patent No.: US 12,291,787 B2
(45) Date of Patent: *May 6, 2025

(54) PROCESS FOR PREPARING ALKALI METAL ALKOXIDES IN A THREE-CHAMBER ELECTROLYSIS CELL

(71) Applicant: Evonik Operations GmbH, Essen (DE)

(72) Inventors: Philip Heinrich Reinsberg, Bonn (DE); Michael Horn, Niederkassel (DE)

(73) Assignee: Evonik Operations GmbH, Essen (DE)

( * ) Notice: Subject to any disclaimer, the term of this patent is extended or adjusted under 35 U.S.C. 154(b) by 589 days.

This patent is subject to a terminal disclaimer.

(21) Appl. No.: 17/650,436

(22) Filed: Feb. 9, 2022

(65) Prior Publication Data

US 2022/0267911 A1    Aug. 25, 2022

(30) Foreign Application Priority Data

Feb. 11, 2021   (EP) ..................................... 21156496

(51) Int. Cl.
*C25B 1/14*    (2006.01)
*C25B 3/07*    (2021.01)
(Continued)

(52) U.S. Cl.
CPC ................. *C25B 1/14* (2013.01); *C25B 3/07* (2021.01); *C25B 3/25* (2021.01); *C25B 9/17* (2021.01); *C25B 9/21* (2021.01); *C25B 13/07* (2021.01)

(58) Field of Classification Search
CPC .... C25B 1/14; C25B 3/00; C25B 3/07; C25B 3/25; C25B 9/21; C25B 13/04; C25B 13/07
(Continued)

(56) References Cited

U.S. PATENT DOCUMENTS 4,417,961 A * 11/1983 Ezzell ....................... C25B 1/46
                                                                     205/536
5,254,227 A   10/1993 Cawlfield et al.
(Continued)

FOREIGN PATENT DOCUMENTS

CN      108411321      8/2018
CN      111074288      4/2020
(Continued)

OTHER PUBLICATIONS

Indian Office Action dated Sep. 6, 2022, in Indian Application No. 202244006659, with English translation, 5 pages.
(Continued)

*Primary Examiner* — Brian W Cohen
*Assistant Examiner* — Alexander R. Parent
(74) *Attorney, Agent, or Firm* — Grüneberg and Myers PLLC (57) ABSTRACT

A process can be used for electrochemical preparation of an alkali metal alkoxide solution. The process is performed in an electrolysis cell having three chambers, where the middle chamber is separated from the cathode chamber by a solid-state electrolyte permeable to cations, for example NaSICON, and from the anode chamber by a diffusion barrier, for example a membrane selective for cations or anions. The process solves a problem where a concentration gradient forms in the middle chamber of the electrolysis cell during the electrolysis, which leads to locally lowered pH values and damage to the solid-state electrolyte used. This is prevented where a gas is introduced into the middle chamber during the electrolysis, which results in better mixing of the electrolyte solution in the middle chamber and prevents the formation of a concentration gradient.

15 Claims, 1 Drawing Sheet

(51) Int. Cl.
*C25B 3/25* (2021.01)
*C25B 9/17* (2021.01)
*C25B 9/21* (2021.01)
*C25B 13/07* (2021.01)

(58) Field of Classification Search
USPC .................................. 205/477–478, 514–515
See application file for complete search history.

(56) References Cited

U.S. PATENT DOCUMENTS

| | | | |
|---|---|---|---|
| 5,389,211 A | 2/1995 | Sharifian et al. | |
| 5,425,856 A | 6/1995 | Buckholtz et al. | |
| 5,575,901 A | 11/1996 | Hulme et al. | |
| 6,217,728 B1 | 4/2001 | Lehmann et al. | |
| 6,221,225 B1 | 4/2001 | Mani | |
| 8,075,758 B2 * | 12/2011 | Joshi | C25B 3/25 205/450 |
| 9,611,555 B2 * | 4/2017 | Bhavaraju | C25B 1/46 |
| 11,174,559 B2 | 11/2021 | Horn et al. | |
| 11,629,415 B2 * | 4/2023 | Horn | C25B 1/14 205/556 |
| 2003/0106805 A1 | 6/2003 | Horn | |
| 2005/0177008 A1 | 8/2005 | Balagopal et al. | |
| 2006/0169594 A1 * | 8/2006 | Balagopal | C25B 3/25 205/450 |
| 2006/0226022 A1 | 10/2006 | Balagopal et al. | |
| 2007/0138020 A1 | 6/2007 | Balagopal et al. | |
| 2007/0158205 A1 | 7/2007 | Balagopal et al. | |
| 2008/0142373 A1 | 6/2008 | Joshi et al. | |
| 2008/0173540 A1 | 7/2008 | Joshi et al. | |
| 2008/0173551 A1 | 7/2008 | Joshi et al. | |
| 2008/0296786 A1 | 12/2008 | Ruwwe et al. | |
| 2009/0090638 A1 | 4/2009 | Kelly et al. | |
| 2010/0044242 A1 | 2/2010 | Bhavaraju et al. | |
| 2011/0240484 A1 * | 10/2011 | Pendleton | C25B 3/25 205/510 |
| 2011/0259736 A1 | 10/2011 | Balagopal et al. | |
| 2012/0085657 A1 | 4/2012 | Bhavaraju | |
| 2014/0008239 A1 | 1/2014 | Bhavaraju | |
| 2019/0292668 A1 | 9/2019 | Fujinuma | |
| 2021/0301407 A1 | 9/2021 | Horn et al. | |
| 2021/0301409 A1 | 9/2021 | Horn et al. | |

FOREIGN PATENT DOCUMENTS

| | | |
|---|---|---|
| DE | 258143 | 7/1988 |
| DE | 4233191 | 7/1993 |
| DE | 10360758 | 7/2005 |
| EP | 0776995 | 6/1997 |
| JP | 2016168542 | 9/2016 |
| JP | 2018030045 | 3/2018 |
| WO | 2009/059315 | 5/2009 |

OTHER PUBLICATIONS

European Search Report issued Aug. 5, 2021 in European Application No. 21156496.8, 5 pages.

U.S. Appl. No. 10/282,252, filed Oct. 29, 2002, 2003/0106805, Michael Horn.

U.S. Appl. No. 17/207,862, filed Mar. 22, 2021, 2021/0301407, Horn et al.

* cited by examiner

PROCESS FOR PREPARING ALKALI METAL ALKOXIDES IN A THREE-CHAMBER ELECTROLYSIS CELL

CROSS-REFERENCE TO RELATED APPLICATIONS

This application claims priority to European Patent Application No. 21156496.8, filed on Feb. 11, 2021, the content of which is hereby incorporated by reference in its entirety.

BACKGROUND OF THE INVENTION

Field of the Invention

The present invention relates to a process for electrochemical preparation of an alkali metal alkoxide solution. The process is performed in an electrolysis cell having three chambers, wherein the middle chamber is separated from the cathode chamber by a solid-state electrolyte permeable to cations, for example NaSICON, and from the anode chamber by a diffusion barrier, for example a membrane selective for cations or anions. The process according to the invention solves the problem that a concentration gradient forms in the middle chamber of the electrolysis cell during the electrolysis, which leads to locally lowered pH values and hence to damage to the solid-state electrolyte used. This is prevented in that a gas is introduced into the middle chamber during the electrolysis, which results in better mixing of the electrolyte solution in the middle chamber and hence prevents the formation of the concentration gradient.

Description of Related Art

The electrochemical preparation of alkali metal alkoxide solutions is an important industrial process which is described, for example, in DE 103 60 758 A1, US 2006/0226022 A1 and WO 2005/059205 A1. The principle of these processes is an electrolysis cell in which the solution of an alkali metal salt, for example sodium chloride or NaOH, is present in the anode chamber, and the alcohol in question or an alcoholic solution with a low concentration of the alkali metal alkoxide in question, for example sodium methoxide or sodium ethoxide, is present in the cathode chamber. The cathode chamber and the anode chamber are separated by a ceramic that conducts the alkali metal ion used, for example NaSICON or analogues thereof for potassium or lithium. On application of a current, chlorine forms at the anode when a chloride salt of the alkali metal is used, and hydrogen and alkoxide ions at the cathode. The result of the balancing of charge is that alkali metal ions migrate from the middle chamber into the cathode chamber via the ceramic that is selective therefor. The balancing of charge between middle chamber and anode chamber results from the migration of cations when cation exchange membranes are used or the migration of anions when anion exchange membranes are used, or from migration of both ion types when non-specific diffusion barriers are used. This increases the concentration of the alkali metal alkoxide in the cathode chamber, and the concentration of the sodium ions in the anolyte is lowered.

NaSICON solid-state electrolytes are also used in the electrochemical preparation of other compounds:

WO 2014/008410 A1 describes an electrolytic process for preparing elemental titanium or rare earths. The basis of this process is that titanium chloride is formed from $TiO_2$ and the corresponding acid, and this is reacted with sodium alkoxide to give titanium alkoxide and NaCl and finally converted electrolytically to elemental titanium and sodium alkoxide.

WO 2007/082092 A2 and WO 2009/059315 A1 describe processes for producing biodiesel, in which, with the aid of alkoxides prepared electrolytically by means of NaSICON, triglycerides are first converted to the corresponding alkali metal triglycerides and are reacted in a second step with electrolytically generated protons to give glycerol and the respective alkali metal hydroxide.

The prior art accordingly describes processes that are performed in electrolysis cells with an ion-permeable layer, for example NaSICON solid-state electrolytes. However, these solid-state electrolytes typically have the disadvantage that they lack long-term stability towards aqueous acids. This is problematic in that, during the electrolysis in the anode chamber, the pH falls as a result of oxidation processes (for example in the case of preparation of halogens by disproportionation or by oxygen formation). These acidic conditions attack the NaSICON solid-state electrolyte to such a degree that the process cannot be used on an industrial scale. In order to counter this problem, various approaches have been described in the prior art.

For instance, three-chamber cells have been proposed in the prior art. These are known in the field of electrodialysis, for example U.S. Pat. No. 6,221,225 B1.

WO 2012/048032 A2 and US 2010/0044242 A1 describe, for example, electrochemical processes for preparing sodium hypochlorite and similar chlorine compounds in such a three-chamber cell. The cathode chamber and the middle chamber of the cell are separated here by a solid-state electrolyte permeable to cations, for example NaSICON. In order to protect this from the acidic anolyte, the middle chamber is supplied, for example, with solution from the cathode chamber. US 2010/0044242 A1 also describes, in FIG. 6, the possibility of mixing solution from the middle chamber with solution from the anode chamber outside the chamber in order to obtain sodium hypochlorite.

Such cells have also been proposed in the prior art for the preparation or purification of alkali metal alkoxides.

For instance, U.S. Pat. No. 5,389,211 A describes a process for purifying alkoxide solutions in which a three-chamber cell is used, in which the chambers are delimited from one another by cation-selective solid-state electrolytes or else nonionic dividing walls. The middle chamber is used as buffer chamber in order to prevent the purified alkoxide or hydroxide solution from the cathode chamber from mixing with the contaminated solution from the anode chamber. U.S. Pat. No. 5,389,211 describes utilization of a three-chamber cell for purification of organic or inorganic hydroxides or alkoxides.

DE 42 33 191 A1 describes the electrolytic recovery of alkoxides from salts and alkoxides in multichamber cells and stacks of multiple cells.

WO 2008/076327 A1 describes a process for preparing alkali metal alkoxides. This uses a three-chamber cell, the middle chamber of which has been filled with alkali metal alkoxide (see, for example, paragraphs [0008] and [0067] of WO 2008/076327 A1). This protects the solid-state electrolyte separating the middle chamber and the cathode chamber from the solution present in the anode chamber, which becomes more acidic in the course of electrolysis. A similar arrangement is described by WO 2009/073062 A1. However, these processes have the disadvantage that alkali metal alkoxide solution is the desired product, but this is consumed and continuously contaminated as buffer solution. A further disadvantage of the process described in WO 2008/076327 A1 is that the formation of the alkoxide in the cathode chamber depends on the diffusion rate of the alkali metal ions through two membranes or solid-state electrolytes. This in turn leads to slowing of the formation the alkoxide.

A further problem results from the geometry of the three-chamber cell. The middle chamber in such a cell is separated from the anode chamber by a diffusion barrier and from the cathode chamber by an ion-conducting ceramic. During the electrolysis, this results unavoidably in development of pH gradients and in dead volumes. This can damage the ion-conducting ceramic and, as a result, increase the voltage demand of the electrolysis and/or lead to fracture of the ceramic.

While this effect takes place throughout the electrolysis chamber, it is particularly critical in the middle chamber since this is bounded by the ion-conducting ceramic. Gases are typically formed at the anode and the cathode, such that there is at least some degree of mixing in these chambers. The unwanted effect mentioned is enhanced by the fact that the brine is generally pumped relatively slowly through the electrolysis cell.

SUMMARY OF THE INVENTION

It was therefore an object of the present invention to provide an improved process for electrolytic preparation of alkali metal alkoxide, which ensures protection of the cation-conducting solid-state electrolyte from acid, but does not have the aforementioned disadvantages, In addition, the process is to feature more sparing use of the reactants compared to the prior art.

A process which achieves the object of the invention has now surprisingly been found.

The process according to the invention is one for preparing a solution $L_1$ <115> of an alkali metal alkoxide XOR in the alcohol ROH in an electrolysis cell E <100>,
  wherein E <100> comprises at least one anode chamber $K_A$ <101>, at least one cathode chamber $K_K$ <102> and at least one interposed middle chamber $K_M$ <103>,
  wherein $K_A$ <101> comprises an anodic electrode $E_A$ <104> and a drain $A_{KA}$ <106>,
  wherein $K_K$ <102> comprises a cathodic electrode $E_K$ <105>, a feed $Z_{KK}$ <107> and a drain $A_{KK}$ <109>,
  wherein $K_M$ <103> comprises a feed $Z_{KM}$ <108>, a gas inlet $G_E$ <122> and a gas outlet $G_A$ <120>, is separated from $K_A$ <101> by a diffusion barrier D <110> and is separated from $K_K$ <102> by an alkali metal cation-conducting solid-state electrolyte $F_K$ <111>,
  wherein $K_M$ <103> and $K_A$ <101> are connected to one another by a connection $V_{AM}$ <112> through which liquid can be routed from $K_M$ <103> into $K_A$ <101>,
  wherein the process comprises the following steps (a), (b), (c) and (d) that proceed simultaneously:
   (a) a solution $L_2$ <113> comprising the alcohol ROH and preferably comprising at least one alkali metal alkoxide XOR is routed through $K_K$ <102>,
   (b) a neutral or alkaline, aqueous solution $L_3$ <114> of a salt S comprising X as cation is routed through $K_M$, then via $V_{AM}$, then through $K_A$ <101>,
   (c) voltage is applied between $E_A$ <104> and $E_K$ <105>,
   (d) a gas I <121> is routed via the gas inlet $G_E$ <122> into the solution $L_3$ <114> in the middle chamber $K_M$ <103>, and removed via the gas outlet $G_A$ <120> from the middle chamber $K_M$ <103>,
  which affords the solution $L_1$ <115> at the drain $A_{KK}$ <109>, with a higher concentration of XOR in $L_1$ <115> than in $L_2$ <113>,
  and which affords an aqueous solution $L_4$ <116> of S at the drain $A_{KA}$ <106>, with a lower concentration of S in $L_4$ <116> than in $L_3$ <114>,
  wherein X is an alkali metal cation and R is an alkyl radical having 1 to 4 carbon atoms.

The invention also includes the following embodiments:

1. Process for preparing a solution $L_1$ <115> of an alkali metal alkoxide XOR in the alcohol ROH in an electrolysis cell E <100>,
   wherein E <100> comprises at least one anode chamber $K_A$ <101>, at least one cathode chamber $K_K$ <102> and at least one interposed middle chamber $K_M$ <103>,
   wherein $K_A$ <101> comprises an anodic electrode $E_A$ <104> and a drain $A_{KA}$ <106>,
   wherein $K_K$ <102> comprises a cathodic electrode $E_K$ <105>, a feed $Z_{KK}$ <107> and a drain $A_{KK}$ <109>,
   wherein $K_M$ <103> comprises a feed $Z_{KM}$ <108>, a gas inlet $G_E$ <122> and a gas outlet $G_A$ <120>, is separated from $K_A$ <101> by a diffusion barrier D <110> and is separated from $K_K$ <102> by an alkali metal cation-conducting solid-state electrolyte $F_K$ <111>,
   wherein $K_M$ <103> and $K_A$ <101> are connected to one another by a connection $V_{AM}$ <112> through which liquid can be routed from $K_M$ <103> into $K_A$ <101>,
   wherein the process comprises the following steps (a), (b), (c) and (d) that proceed simultaneously:
    (a) a solution $L_2$ <113> comprising the alcohol ROH is routed through $K_K$ <102>,
    (b) a neutral or alkaline, aqueous solution $L_3$ <114> of a salt S comprising X as cation is routed through $K_M$, then via $V_{AM}$, then through $K_A$ <101>,
    (c) voltage is applied between $E_A$ <104> and $E_K$ <105>,
    (d) a gas I <121> is routed via the gas inlet $G_E$ <122> into the solution $L_3$ <114> in the middle chamber $K_M$ <103>, and removed via the gas outlet $G_A$ <120> from the middle chamber $K_M$ <103>,
   which affords the solution $L_1$ <115> at the drain $A_{KK}$ <109>, with a higher concentration of XOR in $L_1$ <115> than in $L_2$ <113>,
   and which affords an aqueous solution $L_4$ <116> of S at the drain $A_{KA}$ <106>, with a lower concentration of S in $L_4$ <116> than in $L_3$ <114>,
   wherein X is an alkali metal cation and R is an alkyl radical having 1 to 4 carbon atoms.
2. Process according to embodiment 1, wherein X is selected from the group consisting of $Li^+$, $Na^+$, $K^+$.
3. Process according to embodiments 1 or 2 in S is a halide, sulfate, sulfite, nitrate, hydrogencarbonate or carbonate of X.
4. Process according to any of embodiments 1 to 3, wherein R is selected from the group consisting of methyl and ethyl.
5. Process according to any of embodiments 1 to 4. wherein I comprises at least one gas selected from the group consisting of nitrogen, noble gases, oxygen.
6. Process according to any of embodiments 1 to 5, wherein the diffusion barrier D <110> is selected from the group consisting of cation-conducting and anion-conducting membranes.
7. Process according to any of embodiments 1 to 6, wherein I <121> is routed into the electrolysis cell E <100> at least partly counter to gravity and is removed therefrom at least partly counter to gravity.
8. Process according to any of embodiments 1 to 7, wherein the connection $V_{AM}$ <112> is formed within and/or outside the electrolysis cell E <100>.

9. Process according to any of embodiments 1 to 8, wherein the connection $V_{AM}$ <112> between middle chamber $K_M$ <103> and anode chamber $K_A$ <101> is arranged in such a way that at least a portion of the aqueous solution $L_3$ <114> flows completely through the middle chamber $K_M$ <103> and the anode chamber $K_A$ <101>.

10. Process according to any of embodiments 1 to 9, wherein the alkali metal ion-conducting solid-state electrolyte $F_K$ <111> has a structure of the formula $M^I_{1+2w+x+y+z}M^{II}_wM^{III}_xZr^{IV}_{2-w-x-y}M^V_y(SiO_4)_z(PO_4)_{3-z}$, where $M^I$ is selected from Na$^+$ and Li$^+$, $M^{II}$ is a divalent metal cation, $M^{III}$ is a trivalent metal cation, $M^V$ is a pentavalent metal cation, the Roman indices I, II, III, IV, V indicate the oxidation numbers in which the respective metal cations exist, and w, x, y, z are real numbers, where $0 \leq x < 2$, $0 \leq y < 2$, $0 \leq w < 2$, $0 \leq z < 3$, and where w, x, y, z are chosen such that $1+2w+x-y+z \geq 0$ and $2-w-x-y \geq 0$.

11. Process according to any of embodiments 1 to 10, wherein $L_2$ <113> comprises the alcohol ROH and an alkali metal alkoxide XOR.

12. Process according to embodiment 11, wherein the mass ratio of XOR to alcohol ROH in $L_2$ <113> is in the range from 1:100 to 1:5.

13. Process according to embodiment 11 or 12, wherein the concentration of XOR in $L_1$ <115> is 1.01 to 2.2 times higher than in $L_2$ <113>.

14. Process according to any of embodiments 1 to 13, wherein the concentration of X in $L_3$ <114> is in the range from 3.5 to 5 mol/l.

15. Process according to any of embodiments 1 to 14, which is performed at a temperature of 20 to 70° C. and a pressure of 0.5 to 1.5 bar.

DETAILED DESCRIPTION OF THE INVENTION

Electrolysis Cell E

The process according to the invention is performed in an electrolysis cell E comprising at least one anode chamber $K_A$, at least one cathode chamber $K_K$ and at least one interposed middle chamber $K_M$. This also includes electrolysis cells E having more than one anode chamber $K_A$ and/or cathode chamber $K_K$ and/or middle chamber $K_M$. Such electrolysis cells in which these chambers are joined to one another in the form of modules are described, for example, in DD 258 143 A3 and US 2006/0226022 A1.

The anode chamber $K_A$ comprises an anodic electrode $E_A$. A useful anodic electrode $E_A$ of this kind is any electrode familiar to the person skilled in the art that is stable under the conditions of the process according to the invention. These are described, in particular, in WO 2014/008410 A1, paragraph [024] or DE 10360758 A1, paragraph [031]. This electrode $E_A$ may consist of one layer or consist of multiple planar layers parallel to one another that may each be perforated or expanded. The anodic electrode $E_A$ especially comprises a material selected from the group consisting of ruthenium oxide, iridium oxide, nickel, cobalt, nickel tungstate, nickel titanate, precious metals such as, in particular, platinum, supported on a support such as titanium or Kovar® (an iron/nickel/cobalt alloy in which the individual components are preferably as follows: 54% by mass of iron, 29% by mass of nickel, 17% by mass of cobalt). Further possible anode materials are especially stainless steel, lead, graphite, tungsten carbide, titanium diboride. Preferably, $E_A$ comprises a titanium anode coated with ruthenium oxide/iridium oxide (RuO$_2$+IrO$_2$/Ti).

The cathode chamber $K_K$ comprises a cathodic electrode $E_K$. A useful cathodic electrode $E_K$ of this kind is any electrode familiar to the person skilled in the art that is stable under the conditions. These are described, in particular, in WO 2014/008410 A1 paragraph [025] or DE 10360758 A1, paragraph [030]. This electrode $E_K$ may be selected from the group consisting of mesh wool, three-dimensional matrix structure and "balls". The cathodic electrode $E_K$ especially comprises a material selected from the group consisting of steel, nickel, copper, platinum, platinized metals, palladium, carbon-supported palladium, titanium. Preferably, $E_K$ comprises nickel.

The at least one middle chamber $K_M$ is between the anode chamber $K_A$ and the cathode chamber $K_K$.

The electrolysis cell E typically has an outer wall $W_A$. The outer wall $W_A$ is especially made from a material selected from the group consisting of steel, preferably rubberized steel, plastic, especially from Telene®, (thermoset polydicyclopentadiene), PVC (polyvinylchloride), PVC-C (postchlorinated polyvinylchloride). PVDF (polyvinylidenefluoride). $W_A$ may especially be perforated for feeds and drains. Within $W_A$ are then the at least one anode chamber $K_A$, the at least one cathode chamber $K_K$ and the at least one interposed middle chamber $K_M$.

$K_M$ is separated from $K_A$ by a diffusion barrier D and from $K_K$ by an alkali metal cation-conducting solid-state electrolyte $F_K$.

The diffusion barrier D used may be any material that is stable under the conditions of the process according to the invention and prevents or slows the transfer of protons from the liquid present in the anode chamber $K_A$ into the middle chamber $K_M$.

The diffusion barrier D used is especially a non-ion-specific dividing wall or a membrane permeable to specific ions. The diffusion barrier D is preferably a non-ion-specific dividing wall.

The material for the non-ion-specific dividing wall is especially selected from the group consisting of fabric, which is especially textile fabric or metal weave, glass, which is especially sintered glass or glass frits, ceramic, especially ceramic frits, membrane diaphragms.

If the diffusion barrier D is a "membrane permeable to specific ions", what this means in accordance with the invention is that the respective membrane promotes the diffusion of particular ions therethrough over others. More particularly, what this means is membranes that promote the diffusion therethrough of ions of a particular charge type over ions of the opposite charge. Even more preferably, membranes permeable to specific ions also promote the diffusion of particular ions of one charge type over other ions of the same charge type therethrough.

According to the invention, anion-conducting membranes are those that selectively conduct anions, preferably selectively conduct particular anions. In other words, they promote the diffusion of anions therethrough over that of cations, especially over protons; even more preferably, they additionally promote the diffusion of particular anions therethrough over the diffusion of other anions therethrough.

According to the invention, cation-conducting membranes are those that selectively conduct cations, preferably selectively conduct particular cations. In other words, they promote the diffusion of cations therethrough over that of anions; even more preferably, they promote the diffusion of particular cations therethrough over the diffusion of other cations therethrough, more preferably still that of cations that are not protons, more preferably sodium cations, over protons.

What is meant more particularly by "promote the diffusion of particular ions X over the diffusion of other ions Y" is that the coefficient of diffusion (unit: m$^2$/s) of ion type X at a given temperature for the membrane in question is higher by a factor of 10, preferably 100, preferably 1000, than the coefficient of diffusion of ion type Y for the membrane in question.

If the diffusion barrier D is a "membrane permeable to specific ions", it is preferably an anion-conducting membrane since this particularly efficiently prevents the diffusion of protons from the anode chamber $K_A$ into the middle chamber $K_M$.

The anion-conducting membrane used is especially one selective for the anions encompassed by the salt S. Such membranes are known to and can be used by the person skilled in the art.

Salt S is preferably a halide, sulfate, sulfite, nitrate, hydrogencarbonate or carbonate of X, even more preferably a halide.

Halides are fluorides, chlorides, bromides, iodides. The most preferred halide is chloride.

The anion-conducting membrane used is preferably one selective for halides, preferably chloride.

Anion-conducting membranes are described, for example, by M. A. Hickner, A. M. Herring, E. B. Coughlin, Journal of Polymer Science, Part B: Polymer Physics 2013, 51, 1727-1735 and C. G. Arges, V. Ramani, P. N. Pinfauro, Electrochemical Society Interface 2010, 19, 31-35, WO 2007/048712 A2 and on page 181 of the textbook by Volkmar M. Schmidt, Elektrochemische Verfahrenstechnik: Grundlagen, Reaktionstechnik, Prozessoptimierung [Electrochemical Engineering: Fundamentals, Reaction Technology, Process Optimization], 1st edition (8 Oct. 2003).

Even more preferably, anion-conducting membranes used are accordingly organic polymers that are especially selected from polyethylene, polybenzimidazoles, polyether ketones, polystyrene, polypropylene and fluorinated membranes such as polyperfluoroethylene, preferably polystyrene, where these have covalently bonded functional groups selected from —NH$_3^+$, —NRH$_2^+$, —NR$_3^+$, =NR$^+$; —PR$_3^+$, where R is alkyl groups having preferably 1 to 20 carbon atoms, or other cationic groups. They preferably have covalently bonded functional groups selected from —NH$_3^+$, —NRH$_2^+$ and —NR$_3^+$, more preferably selected from —NH$_3^+$ and —NR$_3^+$, even more preferably —NR$_3^+$.

If the diffusion barrier D is a cation-conducting membrane, it is especially a membrane selective for the cations encompassed by the salt S. Even more preferably, the diffusion barrier D in that case is an alkali metal cation-conducting membrane, even more preferably a potassium and/or sodium ion-conducting membrane, most preferably a sodium ion-conducting membrane.

Cation-conducting membranes are described, for example, on page 181 of the textbook by Volkmar M. Schmidt. Elektrochemische Verfahrenstechnik: Grundlagen, Reaktionstechnik, Prozessoptimierung, 1st edition (8 Oct. 2003).

Even more preferably, cation-conducting membranes used are accordingly organic polymers that are especially selected from polyethylene, polybenzimidazoles, polyether ketones, polystyrene, polypropylene and fluorinated membranes such as polyperfluoroethylene, preferably polystyrene and polyperfluoroethylene, where these bear covalently bonded functional groups selected from —SO$_3^-$, —COO$^-$, —PO$_3^{2-}$ and —PO$_2$H$^-$, preferably —SO$_3^-$ (described in DE 10 2010 062 804 A1, U.S. Pat. No. 4,631,146).

This may be, for example, a sulfonated polyperfluoroethylene (Nafion® with CAS number: 31175-20-9). These are known to the person skilled in the art, for example from WO 2008/076327 A1, paragraph [058], US 2010/0044242 A1, paragraph [0042] or US 2016/02044.59 A1, and are commercially available under the Nafion®, Aciplex® F, Flemion®, Neosepta®, Ultrex®, PC-SK® trade names. Neosepta® membranes are described, for example, by S. A. Mareev, D. Yu. Butylskii, N. D. Pismenskaya, C. Larchet, L. Dammak, V. V. Nikonenko, Journal of Membrane Science 2018, 563, 768-776.

If a cation-conducting membrane is used as diffusion barrier D, this may, for example, be a polymer functionalized with sulfonic acid groups, especially of the formula P$_{NAFION}$ below, where n and m may independently be a whole number from 1 to 10$^6$, preferably a whole number from 10 to 10$^5$, more preferably a whole number from 10$^2$ to 10$^4$.

P$_{NAFION}$

A useful alkali metal cation-conducting solid-state electrolyte $F_K$ is any solid-state electrolyte that can transport cations, especially alkali metal cations, even more preferably sodium cations, from the middle chamber $K_M$ into the cathode chamber $K_K$. Such solid-state electrolytes are known to the person skilled in the art and are described, for example, in DE 10 2015 013 155 A1, in WO 2012/043032 A2, paragraphs [0035], [0039], [0040], in US 2010/0044242 A1, paragraphs [0040], [0041], in DE 10360758 A1, paragraphs [014] to [025]. They are sold commercially under the NaSICON, LiSICON, KSICON name. A sodium ion-conducting solid-state electrolyte $F_K$ is preferred, and this even more preferably has an NaSICON structure. NaSICON structures usable in accordance with the invention are also described, for example, by N. Anantharamulu, K. Koteswara Rao, G. Rambabu, B, Vijaya Kumar, Velchuri Radha, M. Vithal, *J Mater Sci* 2011, 46, 2821-2337.

NaSICON preferably has a structure of the formula $M^I_{1+2w+x-y+z}M^{II}_wM^{III}_xZr^{IV}_{2-w-x-y}M^V_y(SiO_4)_z(PO_4)_{3-z}$.

$M^I$ is selected from $Na^+$, $Li^+$, preferably $Na^+$.

$M^{II}$ is a divalent metal cation, preferably selected from $Mg^{2+}$, $Ca^{2+}$, $Sr^{2+}$, $Ba^{2+}$, $Co^{2+}$, $Ni^{2+}$, more preferably selected from $Co^{2+}$, $Ni^{2+}$.

$M^{III}$ is a trivalent metal cation, preferably selected from $Al^{3+}$, $Ga^{3+}$, $Sc^{3+}$, $La^{3+}$, $Y^{3+}$, $Gd^{3+}$, $Sm^{3+}$, $Lu^{3+}$, $Fe^{3+}$, $Cr^{3+}$, more preferably selected from $Sc^{3+}$, $La^{3+}$, $Y^{3+}$, $Gd^{3+}$, $Sm^{3+}$, especially preferably selected from $Sc^{3+}$, $La^{3+}$.

$M^V$ is a pentavalent metal cation, preferably selected from $V^{5+}$, $Nb^{5+}$, $Ta^{5+}$.

The Roman indices I, II, III, IV, V indicate the oxidation numbers in which the respective metal cations exist.

w, x, y, z are real numbers, where $0 \leq x < 2$, $0 \leq y < 2$, $0 \leq w < 2$, $0 \leq z < 3$, and where w, x, y, z are chosen such that $1+2w+x-y+z \geq 0$ and $2-w-x-y \geq 0$.

Even more preferably in accordance with the invention, NaSICON has a structure of the formula $Na_{(1+v)}Zr_2Si_vP_{(3-v)}O_{12}$ where v is a real number for which $0 \leq v \leq 3$. Most preferably, $v=2,4$.

The cathode chamber $K_K$ also comprises a feed $Z_{KK}$ and a drain $A_{KK}$ that enables addition of liquid, for example the solution $L_2$, to the cathode chamber $K_K$ and removal of liquid present therein, for example the solution $L_1$. The feed $Z_{KK}$ and the drain $A_{KK}$ are mounted on the cathode chamber $K_K$ in such a way that the solution comes into contact with the cathodic electrode $E_K$ as it flows through the cathode chamber $K_K$. This is a prerequisite for the solution $L_1$ to be obtained at the drain $A_{KK}$ in the performance of the process according to the invention when the solution $L_2$ of an alkali metal alkoxide XOR in the alcohol ROH is routed through $K_K$.

The anode chamber $K_A$ also comprises a drain $A_{KA}$ that enables removal of liquid present in the anode chamber $K_A$, for example the aqueous solution $L_4$. In addition, the middle chamber $K_M$ comprises a feed $Z_{KM}$, while $K_A$ and $K_M$ are connected to one another by a connection $V_{AM}$. As a result, it is possible to add a solution $L_3$ to $K_M$ and then route it through $K_M$, and to route it via $V_{AM}$ into the anode chamber $K_A$, then through this $K_A$. $V_{AM}$ and the drain $A_{KA}$ are mounted on the anode chamber $K_A$ in such a way that the solution $L_3$ comes into contact with the anodic electrode $E_A$ as it flows through the anode chamber $K_A$. This is a prerequisite for the aqueous solution $L_4$ to be obtained at the drain $A_{KA}$ in the performance of the process according to the invention when the solution $L_3$ is routed first through $K_M$, then $V_{AM}$, then $K_A$.

Feeds $Z_{KK}$, $Z_{KM}$, $Z_{KA}$ and drains $A_{KK}$, $A_{KA}$, $A_{KM}$ may be mounted on the electrolysis cell by methods known to the person skilled in the art.

According to the invention, the middle chamber $K_M$ has a gas inlet $G_E$ and a gas outlet $G_A$. A suitable gas inlet $G_E$ is any opening in the middle chamber $K_M$ through which gases can be introduced into the middle chamber $K_M$, especially gases I. The gas inlet $G_E$ used is preferably one selected from gas inlet with condensate separator, pressure valve and a hole with a connected ventilation conduit, more preferably a hole with a connected ventilation conduit.

A suitable gas outlet $G_A$ is any opening in the middle chamber $K_M$ through which the gases in the middle chamber $K_M$, especially gases I, can escape into the atmosphere. The gas outlet $G_A$ used is preferably one selected from gas exit, preferably a gas exit with condensate separator, a pressure valve and a hole with a connected ventilation conduit, more preferably a hole with a connected ventilation conduit.

The gas outlet $G_A$ is preferably mounted on the middle chamber $K_M$ such that the gases escape from the middle chamber $K_M$ counter to gravity.

The gas inlet $G_E$ is preferably mounted on the middle chamber $K_M$ such that the gases are introduced into the middle chamber $K_M$ counter to gravity.

The ventilation conduit is connected to the drain $A_{KA}$ <106> (i.e. the chlorine draw or the brine exit from the anolyte chamber), but may alternatively be operated with free discharge to the atmosphere. Utilizing the chlorine draw for the removal of the gas I has the advantage of a simplified construction of the electrolysis cell E. But the removal of the gas I independently of the chlorine draw leads to improvement in the chlorine composition since gas I is not diluted with the chlorine. It is thus particularly preferable when the ventilation conduit is not connected to the drain $A_{KA}$ <106> (i.e. the chlorine draw or the brine exit from the anolyte chamber), i.e. is operated with free discharge to the atmosphere.

The gas I used may be any gas familiar to the person skilled in the art that is suitable for the purpose. I preferably comprises at least one gas selected from the group consisting of nitrogen, noble gases, oxygen, I more preferably comprises at least one gas selected from the group consisting of nitrogen, noble gases.

The gas I used is especially preferably air. This can be introduced into the middle chamber $K_M$ in the form of compressed air.

The connection $V_{AM}$ may be formed within the electrolysis cell E and/or outside the electrolysis cell E.

If the connection $V_{AM}$ is formed within the electrolysis cell E, it is preferably formed by at least one perforation in the diffusion barrier D.

If the connection $V_{AM}$ is formed outside the electrolysis cell E, it is preferably formed by a connection of $K_M$ and $K_A$ that runs outside the electrolysis cell E, especially in that a drain $A_{KM}$ through the outer wall $W_A$ is formed in the middle chamber $K_M$, preferably at the base of the middle chamber $K_M$, the feed $Z_{KM}$ more preferably being at the top end of the middle chamber $K_M$, and a feed $Z_{KA}$ through the outer wall $W_A$ is formed in the anode chamber $K_A$, preferably at the base of the anode chamber $K_A$, and these are connected by a conduit, for example a pipe or a hose, preferably comprising a material selected from rubber and plastic. The drain $A_{KA}$ is then more preferably at the top end of the anode chamber $K_A$.

"Drain $A_{KM}$ at the base of the middle chamber $K_M$" means that the drain $A_{KM}$ is mounted on the electrolysis cell E in such a way that the solution $L_3$ leaves the middle chamber $K_M$ in the direction of gravity.

"Feed $Z_{KA}$ at the base of the anode chamber $K_A$" means that the feed $Z_{KA}$ is mounted on the electrolysis cell E in such a way that the solution $L_3$ enters the anode chamber $K_A$ counter to gravity.

"Feed $Z_{KM}$ at the top end of the middle chamber $K_M$" means that the feed $Z_{KM}$ is mounted on the electrolysis cell E in such a way that the solution $L_3$ enters the middle chamber $K_M$ in the direction of gravity.

"Drain $A_{KA}$ at the top end of the anode chamber $K_A$" means that the drain $A_{KA}$ is mounted on the electrolysis cell E in such a way that the solution $L_4$ leaves the anode chamber $K_A$ counter to gravity.

This embodiment is particularly advantageous and therefore preferred when the drain $A_{KM}$ is formed by the outer wall $W_A$ at the base of the middle chamber $K_M$, and the feed $Z_{KA}$ by the outer wall $W_A$ at the base of the anode chamber $K_A$. This arrangement makes it possible in a particularly simple manner to separate gases formed in the middle chamber $K_M$ from $L_3$ through the gas outlet $G_A$, while gases formed in the anode chamber $K_A$ leave the anode chamber $K_A$ with $L_4$ and can then be separated off further.

Accordingly, the flow direction of $L_3$ into $K_M$ is the opposite of or the same as the flow direction of $L_3$ into $K_A$, preferably the opposite, according to how the connection $V_{AM}$ is mounted on the electrolysis cell E. Preferably, the flow direction of $L_3$ into $K_M$ is in the direction of gravity.

It is also preferable that I <121> is routed into the electrolysis cell E <100> at least partly counter to gravity and is removed therefrom at least partly counter to gravity.

In a preferred embodiment of the present invention, connection $V_{AM}$ between middle chamber $K_M$ and anode chamber $K_A$ is arranged such that at least part of the aqueous solution $L_3$, preferably the entire aqueous solution $L_3$, flows completely through the middle chamber $K_M$ and the anode chamber $K_A$.

Figure 1:
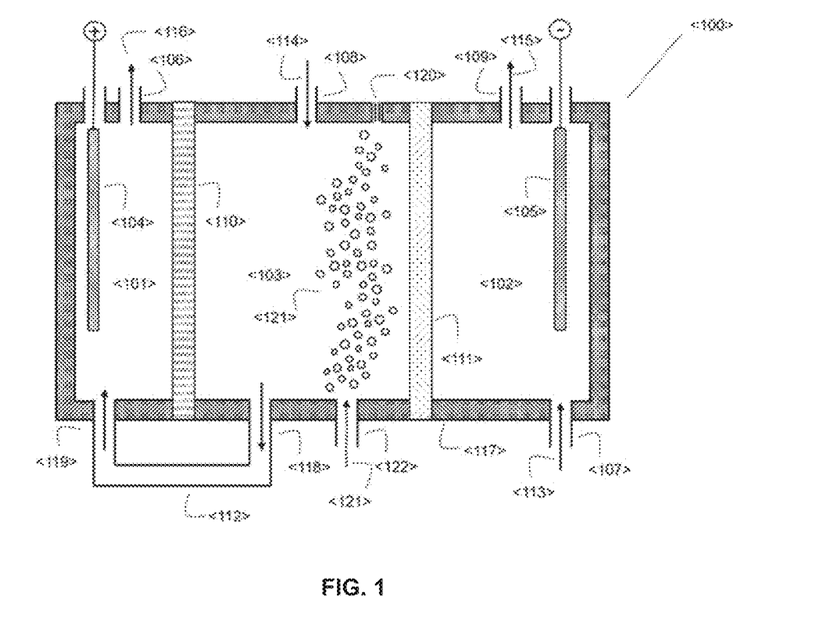
FIG. 1 shows the process according to the invention in a three-chamber cell E <100> comprising a cathode chamber $K_K$ <102>, an anode chamber $K_A$ <101> and an interposed middle chamber $K_M$ <103>.

When the connection $V_{AM}$ <112> is formed outside the electrolysis cell E <100>, this may especially be implemented in that $Z_{KM}$ <108> and $A_{KM}$ <118> are arranged at opposite ends of the outer wall $W_A$ <117> of the middle chamber $K_M$ <103> (i.e. $Z_{KM}$ <108> at the base and $A_{KM}$ <118> at the top end of the electrolysis cell E <100> or vice versa) and $Z_{KA}$ <119> and $A_{KA}$ <106> are arranged at opposite ends of the outer wall $W_A$ <117> of the anode chamber $K_A$ <101> (i.e. $Z_{KA}$ <119> at the base and $A_{KA}$ <106> at the top end of the electrolysis cell E <100> or vice versa), as shown more particularly in FIG. 1. By virtue of this geometry, $L_3$ <114> must flow through the two chambers $K_M$ <103> and $K_A$ <101>. It is possible here for $Z_{KA}$ <119> and $Z_{KM}$ <108> to be formed on the same side of the electrolysis cell E <100>, in which case $A_{KM}$ <118> and $A_{KA}$ <106> are automatically also formed on the same side of the electrolysis cell E <100>. Alternatively, as shown in FIG. 1, it is possible for $Z_{KA}$ <119> and $Z_{KM}$ <108> to be formed on opposite sides of the electrolysis cell E <100>, in which case $A_{KM}$ <118> and $A_{KA}$ <106> are automatically also formed on opposite sides of the electrolysis cell E <100>.

Figure 2:
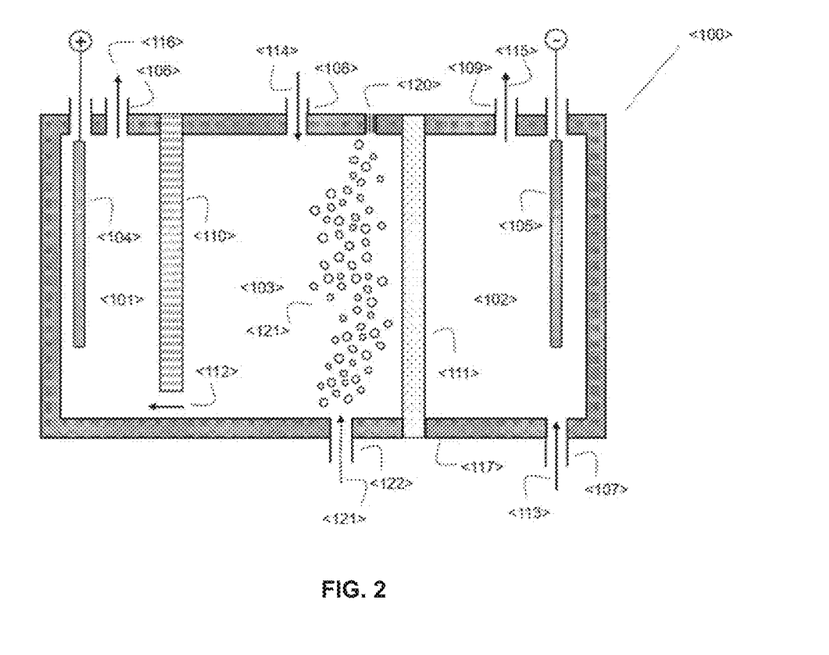
FIG. 2 shows an embodiment of the process according to the invention corresponding to FIG. 1, where the connection $V_{AM}$ <112> from the middle chamber $K_M$ <103> to the anode chamber $K_A$ <101> is formed by a perforation in the diffusion barrier D <110>.

When the connection $V_{AM}$ <112> is formed within the electrolysis cell E <100>, this may especially be implemented in that one side ("side A") of the electrolysis cell E <100>, which is the top end or the base of the electrolysis cell E <100>, preferably the top end as shown in FIG. 2, comprises the feed $Z_{KM}$ <108> and the drain $A_{KA}$ <106>, and the diffusion barrier D <110> extends proceeding from this side A into the electrolysis cell <100>, but does not quite reach up to the side ("side B") of the electrolysis cell E <100> opposite side A, which is then the base or the top end of the electrolysis cell E <100>, and at the same time covers 50% or more of the height of the three-chamber cell E <100>, preferably 60% to 99% of the height of the three-chamber cell E <100>, more preferably 70% to 95% of the height of the three-chamber cell E <100>, even more preferably 80% to 90% of the height of the three-chamber cell E <100>, more preferably still 85% of the height of the three-chamber cell E <100>. Because the diffusion barrier D <110> does not touch side E of the three-chamber cell E <100>, a gap thus arises between diffusion barrier D <110> and the outer wall $W_A$ of side B of the three-chamber cell E <100>. In that case, the gap is the connection $V_{AM}$ <112>. By virtue of this geometry, $L_3$ must flow completely through the two chambers $K_M$ and $K_A$.

These embodiments best assure that the aqueous salt solution $L_3$ flows past the acid-sensitive solid-state electrolyte before it comes into contact with the anodic electrode $E_A$ <104>, which results in the formation of acids.

According to the invention, "base of the electrolysis cell E" is the side of the electrolysis cell E through which a solution (e.g. $L_3$ <114> in the case of $A_{KM}$ <118> in FIG. 1) exits from the electrolysis cell E in the same direction as gravity, or the side of the electrolysis cell E through which a solution (e.g. $L_2$ <113> in the case of $Z_{KK}$ <107> in FIGS. 1 and 2, and $L_3$ <114> in the case of $A_{KA}$ <119> in FIG. 1) is supplied to the electrolysis cell E counter to gravity.

According to the invention, "top end of the electrolysis cell E" is the side of the electrolysis cell E through which a solution (e.g. $L_4$ <116> in the case of $A_{KA}$ <106> and $L_1$ <115> in the case of $A_{KK}$ <109> in FIGS. 1 and 2) exits from the electrolysis cell E counter to gravity, or the side of the electrolysis cell E through which a solution (e.g. $L_3$ <114> in the case of $Z_{KM}$ <108> in FIGS. 1 and 2) is supplied to the electrolysis cell E in the same direction as gravity.

Process Steps According to the Invention

The process according to the invention comprises steps (a), (b), (c) and (d) as follows, which are performed simultaneously.

In step (a), a solution $L_2$ comprising the alcohol ROH, preferably comprising an alkali metal alkoxide XOR in the alcohol ROH, is routed through $K_K$. X is an alkali metal cation and R is an alkyl radical having 1 to 4 carbon atoms.

X is preferably selected from the group consisting of $Li^+$, $K^+$, $Na^+$, more preferably from the group consisting of $K^+$, $Na^+$. Most preferably, X=$Na^+$.

R is preferably selected from the group consisting of n-propyl, iso-propyl, ethyl and methyl, more preferably from the group consisting of ethyl and methyl. R is most preferably methyl.

Solution $L_2$ is preferably free of water. What is meant in accordance with the invention by "free of water" is that the weight of water in solution $L_2$ based on the weight of alcohol ROH in solution $L_2$ (mass ratio) is ≤1:10, more preferably ≤1:20, even more preferably ≤1:100, even more preferably ≤0.5:100.

If solution $L_2$ comprises XOR, the proportion by mass of XOR in solution $L_2$, based on the overall solution $L_2$, is especially >0% to 30% by weight, preferably 5% to 20% by weight, more preferably 10% to 20% by weight, more preferably 10% to 15% by weight, roost preferably 13% to 14% by weight, at the very most preferably 13% by weight.

If solution $L_2$ comprises XOR, the mass ratio of XOR to alcohol ROH in solution $L_2$ is especially in the range of 1:100 to 1:5, more preferably in the range of 1:25 to 3:20, even more preferably in the range of 1:12 to 1:8, even more preferably 1:10.

In step (b), a neutral or alkaline aqueous solution $L_3$ of a salt S comprising X as cation is routed through $K_M$, then via $V_{AM}$, then through $K_A$.

The salt S is described above. The pH of the aqueous solution $L_3$ is ≥7.0, preferably in the range of 7 to 12, more preferably in the range of 8 to 11, even more preferably 10 to 11, most preferably 10.5.

The proportion by mass of salt S in solution $L_3$ is preferably in the range of >0% to 20% by weight, preferably 1% to 20% by weight, more preferably 5% to 20% by weight, even more preferably 10% to 20% by weight, most preferably 20% by weight, based on the overall solution $L_3$.

In step (c), a voltage is then applied between $E_A$ and $E_K$. This results in transfer of current from the charge source to the anode, transfer of charge via ions to the cathode and ultimately transfer of current back to the charge source. The charge source is known to the person skilled in the art and is typically a rectifier that converts alternating current to direct current and can generate particular voltages via voltage transformers.

This leads in turn to the following consequences:
- solution L1 <115> is obtained at the drain $A_{KK}$ <109>, with a higher concentration of XOR in $L_1$ <115> than in $L_2$ <113>,
- an aqueous solution $L_4$ <116> of S is obtained at the drain $A_{KA}$ <106>, with a lower concentration of S in $L_4$ <116> than in $L_3$ <114>.

In the process according to the invention, in particular, such a voltage is applied that such a current flows that the current density (=ratio of the current supplied to the electrolysis cell to the area of the solid-state electrolyte in contact with the anolyte present in the middle chamber $K_M$) is in the range from 10 to 8000 A/m², more preferably in the range from 100 to 2000 A/m², even more preferably in the range from 300 to 800 A/m², and even more preferably is 494 A/m². This can be determined in a standard manner by the person skilled in the art. The area of the solid-state electrolyte in contact with the anolyte present in the middle chamber $K_M$ is especially 0.00001 to 10 m², preferably 0.0001 to 2.5 m², more preferably 0.0002 to 0.15 m², even more preferably 2.33 cm².

It will be apparent that, in the process according to the invention, step (c) is performed when the two chambers $K_M$ and $K_A$ are at least partly laden with $L_3$ and $K_K$ is at least partly laden with $L_2$.

The fact that transfer of charge takes place between $E_A$ and $E_K$ in step (c) implies that $K_K$, $K_M$ and $K_A$ are simultaneously laden with $L_2$ and $L_3$ such that they cover the electrodes $E_A$ and $E_K$ to such an extent that the circuit is complete.

This is the case especially when a liquid stream of $L_3$ is routed continuously through $K_M$, $V_{AM}$ and $K_A$ and a liquid stream of $L_2$ through $K_K$, and the liquid stream of $L_3$ covers electrode $E_A$ and the liquid stream of $L_2$ covers electrode $E_K$ at least partly, preferably completely.

In step (d) of the process according to the invention, gas I <121> is routed via the gas inlet $G_E$ <122> into the solution $L_3$ <114> in the middle chamber $K_M$ <103>, and removed via the gas outlet $G_A$ <120> from the middle chamber $K_M$ <103>.

This introduction of gas I <121> leads to vortexing and turbulence in the solution $L_3$ <114> in the middle chamber $K_M$ <103>, which destroys the pH gradient that builds up with progressive electrolysis.

In a further preferred embodiment, the process according to the invention is performed continuously, i.e. step (a), step (b) and step (d) are performed continuously, while applying voltage as per step (c).

In the process according to the invention, solution $L_1$ is obtained at the drain $A_{KK}$, with a higher concentration of XOR in $L_1$ than in $L_2$. If $L_2$ already comprised XOR, the concentration of XOR in $L_1$ is preferably 1.01 to 2.2 times, more preferably 1.04 to 1.8 times, even more preferably 1.077 to 1.4 times, even more preferably 1.077 to 1.08 times, higher than in $L_2$, most preferably 1.077 times higher than in $L_2$, where the proportion by mass of XOR in $L_1$ and in $L_2$ is more preferably in the range from 10% to 20% by weight, even more preferably 13% to 14% by weight.

An aqueous solution $L_4$ of S is obtained at the drain $A_{KA}$, with a lower concentration of S in $L_4$ than in $L_3$.

The concentration of the cation X in the aqueous solution $L_3$ is preferably in the range of 3.5 to 5 mol/l, more preferably 4 mol/l. The concentration of the cation X in the aqueous solution $L_4$ is more preferably 0.5 mol/l lower than that of the aqueous solution $L_3$ used in each case.

In particular, the process according to the invention is performed at a temperature of 20° C. to 70° C., preferably 35° C. to 65° C., more preferably 35° C. to 60° C., even more preferably 35° C. to 50° C., and a pressure of 0.5 bar to 1.5 bar, preferably 0.9 bar to 1.1 bar, more preferably 1.0 bar.

In the course of performance of the process according to the invention, hydrogen is typically formed in the cathode chamber $K_K$, which can be removed from the cell together with solution $L_1$ via drain $A_{KK}$. The mixture of hydrogen and solution $L_1$ can then, in a particular embodiment of the present invention, be separated by methods known to the person skilled in the art. When the alkali metal compound used is a halide, especially chloride, it is possible for chlorine or another halogen gas to form in the anode chamber $K_A$, and this can be removed from the cell together with solution $L_4$ via drain $A_{KK}$. In addition, it is also possible for oxygen or/and carbon dioxide to form, which can likewise be removed. The mixture of chlorine, oxygen and/or $CO_2$ and solution $L_4$ can then, in a particular embodiment of the present invention, be separated by methods known to the person skilled in the art. It is then likewise possible, after the chlorine, oxygen and/or $CO_2$ gases have been separated from solution $L_4$, to separate these by methods known to the person skilled in the art.

These results were surprising and unexpected in the light of the prior art. The process according to the invention protects the acid-labile solid-state electrolyte from corrosion without, as in the prior art, having to sacrifice alkoxide solution from the cathode space as buffer solution. Thus, the process according to the invention is more efficient than the procedure described in WO 2003/076327 A1 and WO 2009/073062 A1, in which the product solution is used for the middle chamber, which reduces the overall conversion.

In addition, by virtue of a gas I being routed through the middle chamber, the electrolyte present in the middle chamber is subjected to constant turbulent mixing, such that it is not possible for any pH gradient that can damage the acid-sensitive alkali metal ion-conducting solid-state electrolyte to develop.

FIGURES

FIG. 1 shows the process according to the invention in a three-chamber cell E <100> comprising a cathode chamber $K_K$ <102>, an anode chamber $K_A$ <101> and an interposed middle chamber $K_M$ <103>. The three chambers are bounded by an outer wall <117> of the three-chamber cell E <100>. The cathode chamber $K_K$ <102> is also separated from the middle chamber $K_M$ <103> by an NaSICON solid-state electrolyte $F_K$ <111> which is selectively permeable to sodium ions. The middle chamber $K_M$ <103> is additionally separated in turn from the anode chamber $K_A$ <101> by a diffusion barrier D <110>. The NaSICON solid-state electrolyte $F_K$ <111> and the diffusion barrier D <110> extend over the entire depth and height of the three-chamber cell E <100>.

A solution of sodium methoxide in methanol $L_2$ <113> is routed through the cathode chamber $K_K$ <102>. An aqueous solution of sodium chloride $L_3$ <114> with ph 10.5 is introduced via the feed $Z_{KM}$ <108>, in the direction of gravity, into the middle chamber $K_M$ <103>. The connection $V_{AM}$ <112> formed between a drain $A_{KM}$ <118> from the middle chamber $K_M$ <103> and a feed $Z_{KA}$ <119> to the anode chamber $K_A$ <101> connects the middle chamber $K_M$ <103> to the anode chamber $K_A$ <101>. Sodium chloride solution $L_3$ <114> is routed through this connection $V_{AM}$ <112> from the middle chamber $K_M$ <103> into the anode chamber $K_A$ <101>. On application of a voltage, methanol is reduced to methoxide and $H_2$ in the cathode chamber $K_K$ <102>. At the same time, sodium ions diffuse from the middle chamber $K_M$ <103> through the NaSICON solid-state electrolyte $F_K$ <111> into the cathode chamber $K_K$ <102>. Overall, this increases the concentration of sodium methoxide in the cathode chamber $K_K$ <102>, which affords a methanolic solution of sodium methoxide $L_1$ <115>, the sodium methoxide concentration of which is elevated compared to $L_2$ <113>. In the anode chamber $K_A$ <101>, chloride ions from $L_3$ <114> are oxidized to $Cl_2$.

$Cl_2$ gives an acidic reaction in aqueous solution. Owing to the geometry of the three-chamber cell E <100> and the guiding of the aqueous solution $L_3$ <114>, the acid-sensitive NaSICON solid-state electrolyte <111> is protected from the elevated acidity, compared to $L_3$ <114>, of the solution $L_4$ <116> that results in the anode chamber $K_A$ <101>.

At the base of the three-chamber cell E <100> is a gas inlet $G_E$ <122> through which compressed air as gas I <121> is routed into the solution $L_3$ <114> in the middle chamber $K_M$ <103>. This results in vortexing and turbulence in the solution $L_3$ <114>, which destroys any pH gradient that makes electrolysis difficult and builds up in the middle chamber $K_M$ <103> with progressive electrolysis. The compressed air is removed from the middle chamber $K_M$ <103> via the gas outlet $G_A$ <120>.

FIG. 2 shows an embodiment of the process according to the invention corresponding to that shown in FIG. 1. The sole difference here is that the connection $V_{AM}$ <112> from the middle chamber $K_M$ <103> to the anode chamber $K_A$ <101> is formed by a perforation in the diffusion barrier D <110>.

Preferred Embodiments of the Invention

FIG. 1 shows a preferred embodiment of the invention in a three-chamber cell E <100>. This comprises a cathode chamber $K_K$ <102>, a middle chamber $K_M$ <103> and an anode chamber $K_A$ <101>. The anode chamber $K_A$ <101> and the middle chamber $K_M$ <103> are separated from one another by an anion exchange membrane as diffusion barrier D <110> that extends over the entire cross section of the three-chamber cell E <100>. The cathode chamber $K_K$ <102> and the middle chamber $K_M$ <103> are separated from one another by a permeable solid-state electrolyte (NaSICON) <111> selective for sodium ions, which extends over the entire cross section of the three-chamber cell E <100>. The cathode chamber $K_K$ <102> comprises a cathodic electrode $E_K$ <105>, a feed $Z_{KK}$ <107> and a drain $A_{KK}$ <109>.

The anode chamber $K_A$ <101> comprises an anodic electrode $E_A$ <104> and a drain $A_{KA}$ <106> and is connected to the middle chamber $K_M$ <103> via the connection $V_{AM}$ <112>. The middle chamber $K_M$ <103> additionally comprises a feed $Z_{KM}$ <108>. In the embodiment according to FIG. 1, the connection $V_{AM}$ <112> is formed outside the electrolysis cell E <100>, especially by a pipe or hose, the material of which may be selected from rubber, metal and plastic, with which liquid can be routed from the middle chamber $K_M$ <103> into the anode chamber $K_A$ <101> outside the outer wall $W_A$ <117> of the three-chamber cell E <100>. The connection $V_{AM}$ <112> connects a drain $A_{KM}$ <118> that penetrates the outer wall $W_A$ <117> of the electrolysis cell E <100> at the base of the middle chamber $K_M$ <103> to a feed $Z_{KA}$ <119> that penetrates the outer wall $W_A$ <117> of the electrolysis cell E <100> at the base of the anode chamber $K_A$ <101>.

An electrolyte $L_2$ <113> is routed into the cathode chamber $K_K$ <102> via the feed $Z_{KK}$ <107>. The electrolyte $L_2$ <113> comprises methanol; the electrolyte $L_2$ <113> used is preferably a methanolic solution of sodium methoxide $L_2$ <113>.

At the same time, an aqueous NaCl solution $L_3$ <114> with pH 10.5 is introduced into the middle chamber $K_M$ <103> via the feed $Z_{KM}$ <108>. This flows through the middle chamber $K_M$ <103> and the connection $V_{AM}$ <112> into the anode chamber $K_A$ <101>.

At the same time, a voltage is applied between the cathodic electrode $E_K$ <105> and the anodic electrode $E_A$ <104>. This results in reduction of methanol in the electrolyte $L_2$ <113> to give methoxide and $H_2$ in the cathode chamber $K_K$ <102> ($CH_3OH+e^- \rightarrow CH_3O^- + \frac{1}{2}H_2$). In the anode chamber $K_A$ <101>, the oxidation of chloride ions takes place to give molecular chlorine ($Cl^- \rightarrow \frac{1}{2}Cl_2 + e^-$), Chlorine gas ($Cl_2$) in water, according to the reaction $Cl_2 + H_2O \rightarrow HOCl + HCl$, forms hypochlorous acid and hydrochloric acid, which give an acidic reaction with further water molecules. The acidity damages the NaSICON solid-state electrolyte <111>, but is restricted to the anode chamber $K_A$ <101> by the arrangement according to the invention, and hence kept away from the NaSICON sold-state electrolyte $F_K$ <111> in the electrolysis cell E <100>. This considerably increases the lifetime thereof.

At the same time, sodium ions diffuse from the middle chamber $K_M$ <103> through the NaSICON solid-state electrolyte <111> into the cathode chamber $K_K$ <102>, Overall, this increases the concentration of sodium methoxide in the cathode chamber $K_K$ <102>, which affords a methanolic solution of sodium methoxide $L_1$ <115>, the sodium methoxide concentration of which is elevated compared to $L_2$ <113>. Owing to the geometry of the three-chamber cell E <100> and the guiding of the aqueous solution $L_3$ <114> according to the invention, the acid-sensitive NaSICON solid-state electrolyte <111> is protected from the elevated acidity, compared to $L_3$ <114>, of the solution $L_4$ <116> that results in the anode chamber $K_A$ <101>.

At the base of the three-chamber cell E <100> is a gas inlet $G_E$ <122> through which compressed air as gas I <121> is routed into the solution $L_3$ <114> in the middle chamber $K_M$ <103>. This results in vortexing and turbulence in the solution $L_3$ <114>, which destroys any pH gradient that damages the solid-state electrolyte, makes electrolysis difficult and builds up in the middle chamber $K_M$ <103> with progressive electrolysis. The compressed air is then removed from the middle chamber $K_M$ <103> via the gas outlet $G_A$ <120>.

The embodiment of the present invention shown in FIG. 2 corresponds to that shown in FIG. 1. The only difference here is that the connection $V_{AM}$ <112> within the electrolysis cell E <100> takes such a form that the diffusion barrier D <110> does not extend over the entire cross section of the three-chamber cell E <100>. The connection $V_{AM}$ <112> from the middle chamber $K_M$ <103> to the anode chamber $K_A$ <101> is thus formed by a gap in the diffusion barrier to D <110>. In further preferred embodiments of the present invention, it is also possible to utilize diffusion barriers D <110> having more than one gap, such that the connection $V_{AM}$ <112> between middle chamber $K_M$ <103> and anode chamber $K_A$ <101> is formed by multiple gaps.

EXAMPLES

Comparative Example 1

Sodium methoxide (SM) was prepared via a cathodic process, wherein the anolyte supplied in the middle chamber was 20% by weight NaCl solution (in water) and that supplied in the cathode chamber was 10% by weight methanolic SM solution.

The electrolysis cell consisted of three chambers that corresponded to those shown in FIG. 1, except that they did not have any gas inlet $G_E$ <122> or any gas outlet $G_A$ <120>. The anolyte was transferred through the middle chamber into the anode chamber. The connection between middle chamber and anode chamber was established by a hose mounted at the base of the electrolysis cell. The anode chamber and middle chamber were separated by a 2.83 m² cation exchange membrane (Tokuyama AMX, ammonium groups on polymer). Cathode chamber and middle chamber were separated by a ceramic of the NaSICON type with an area of 2.83 cm². The ceramic has a chemical composition of the formula $Na_{3.4}Zr_{2.0}Si_{2.4}P_{0.6}O_{12}$. The flow rate of the anolyte was 1 l/h, that of the catholyte was 90 ml/h, and a current of 0.14 A was applied. The temperature was 35° C. The electrolysis was conducted for 500 hours at a constant voltage of 5 V.

However, a pH gradient developed in the middle chamber over a prolonged period, which is attributable to the migration of the ions to the electrodes in the course of the electrolysis and the spread of the protons formed in further reactions at the anode. This local increase in pH is undesirable since it can attack the solid-state electrolyte and can lead to corrosion and fracture of the solid-state electrolyte specifically in the case of very long periods of operation.

Comparative Example 2

Comparative Example 1 was repeated with a two-chamber cell comprising just one anode chamber and one cathode chamber, with the anode chamber separated from the cathode chamber by the ceramic of the NaSICON type, This electrolysis cell thus did not contain any middle chamber. This is reflected in faster corrosion of the ceramic compared to the comparative example, which leads to a rapid rise in the voltage curve. With a starting voltage value of <5 V, this rises to >20 V within 100 hours.

Inventive Example

Comparative Example 1 was repeated, with inclusion of a hole of diameter 2 mm (hole 1) as gas outlet $G_A$ in the middle chamber, in addition to the feed for the anolyte. A ventilation conduit was attached to this hole 1.

Additionally included as gas inlet $G_E$ at the base of the middle chamber was a further hole (hole 2), into which compressed air was introduced via a gas valve and left the middle chamber via hole 1.

Result

The use of a three-chamber cell as in the process according to the invention prevents the corrosion of the sold-state electrolyte, and at the same time there is no need to sacrifice alkali metal alkoxide product for the middle chamber and the voltage is kept constant. These advantages that are apparent from the comparison of the two Comparative Examples 1 and 2 already underline the surprising effect of the present invention.

Furthermore, the development of the gas feed and gas removal in the middle chamber according to the inventive example makes it possible to introduce gases such as air. This introduction of gases leads to vortexing and turbulence in the electrolyte in the middle chamber, which destroys the pH gradient that builds up with progressive electrolysis. This gradient, specifically in the case of very long operating periods, can make the electrolysis even more difficult and lead to corrosion and ultimately fracture of the solid-state electrolyte. In the execution according to the inventive example, this pH gradient is destroyed, which, in addition to the advantages mentioned that are provided by a three-chamber cell over a two-chamber cell, further increases the stability of the solid-state electrolyte.

The invention claimed is:

1. A process for preparing a solution $L_1$ of an alkali metal alkoxide XOR in an alcohol ROH in an electrolysis cell E comprising at least one anode chamber $K_A$, at least one cathode chamber $K_K$, and at least one interposed middle chamber $K_M$, the process comprising:
   (a) routing a solution $L_2$ comprising the alcohol ROH through the at least one cathode chamber $K_K$,
   (b) routing a neutral or alkaline, aqueous solution $L_3$ of a salt S comprising X as a cation through the at least one interposed middle chamber $K_M$, then via a connection $V_{AM}$, then through the at least one anode chamber $K_A$,
   (c) applying a voltage between an anodic electrode $E_A$ and a cathodic electrode $E_K$, and
   (d) routing a gas I via a gas inlet $G_E$ into the aqueous solution $L_3$ in the at least one interposed middle chamber $K_M$, and removing the gas I via a gas outlet $G_A$ from the at least one interposed middle chamber $K_M$,
   wherein the at least one anode chamber $K_A$ comprises the anodic electrode $E_A$ and a drain $A_{KA}$,
   wherein the at least one cathode chamber $K_K$ comprises the cathodic electrode $E_K$, a feed $Z_{KK}$, and a drain $A_{KK}$,
   wherein the at least one interposed middle chamber $K_M$ comprises a feed $Z_{KM}$, the gas inlet $G_E$, and the gas outlet $G_A$, and is separated from the at least one anode chamber $K_A$ by a diffusion barrier D and is separated from the at least one cathode chamber $K_K$ by an alkali metal cation-conducting solid-state electrolyte $F_K$,
   wherein the at least one interposed middle chamber $K_M$ and the at least one anode chamber $K_A$ are connected to one another by the connection $V_{AM}$ through which liquid can be routed from the at least one interposed middle chamber $K_M$ into the at least one anode chamber $K_A$,
   wherein (a), (b), (c), and (d) proceed simultaneously, which affords the solution $L_1$ at the drain $A_{KK}$, with a higher concentration of the alkali metal alkoxide XOR in the solution $L_1$ than in the solution $L_2$, and which affords an aqueous solution $L_4$ of the salt S at the drain $A_{KA}$, with a lower concentration of the salt S in the aqueous solution $L_4$ than in the aqueous solution $L_3$,
   wherein X is an alkali metal cation, and
   wherein R is an alkyl group having 1 to 4 carbon atoms.

2. The process according to claim 1, wherein X is selected from the group consisting of $Li^+$, $Na^+$, and $K^+$.

3. The process according to claim 1, wherein the salt S is a halide, sulfate, sulfite, nitrate, hydrogencarbonate, or carbonate of X.

4. The process according to claim 1, wherein R is selected from the group consisting of methyl and ethyl.

5. The process according to claim 1, wherein the gas I comprises at least one gas selected from the group consisting of nitrogen, a noble gas, and oxygen.

6. The process according to claim 1, wherein the diffusion barrier D is selected from the group consisting of a cation-conducting membrane and an anion-conducting membrane.

7. The process according to claim 1, wherein the gas I is routed into the electrolysis cell E at least partly counter to gravity and is removed therefrom at least partly counter to gravity.

8. The process according to claim 1, wherein the connection $V_{AM}$ is formed within and/or outside the electrolysis cell E.

9. The process according to claim 1, wherein the connection VAM between the at least one interposed middle chamber $K_M$ and the at least one anode chamber $K_A$ is arranged in such a way that at least a portion of the aqueous solution $L_3$ flows completely through the at least one interposed middle chamber $K_M$ and the at least one anode chamber $K_A$.

10. The process according to claim 1, wherein the alkali metal ion-conducting solid-state electrolyte $F_K$ has a structure of the formula wherein $M^I$ is selected from the group consisting of $Na^+$ and $Li^+$, $M^{II}$ is a divalent metal cation, $M^{III}$ is a trivalent metal cation, $M^V$ is a pentavalent metal cation, the Roman indices I, II, III, IV, and V indicate oxidation numbers in which the respective metal cations exist, and w, x, y, and z are real numbers, where $0 \leq x < 2$, $0 \leq y < 2$, $0 \leq w < 2$, $0 \leq z < 3$, and where w, x, y, and z are chosen such that $1+2w+x-y+z \geq 0$ and $2-w-x-y \geq 0$.

11. The process according to claim 1, wherein the solution $L_2$ comprises the alcohol ROH and the alkali metal alkoxide XOR.

12. The process according to claim 11, wherein a mass ratio of the alkali metal alkoxide XOR to the alcohol ROH in the solution $L_2$ is in a range from 1:100 to 1:5.

13. The process according to claim 11, wherein a concentration of the alkali metal alkoxide XOR in the solution $L_1$ is 1.01 to 2.2 times higher than in the solution $L_2$.

14. The process according to claim 1, wherein a concentration of X in the aqueous solution $L_3$ is in a range from 3.5 to 5 mol/l.

15. The process according to claim 1, which is performed at a temperature of 20 to 70° C. and a pressure of 0.5 to 1.5 bar.

* * * * *